(12) United States Patent
Silverman et al.

(10) Patent No.: US 7,269,354 B1
(45) Date of Patent: Sep. 11, 2007

(54) SUPERHETERODYNE PHOTONIC RECEIVER USING NON-SERIAL FREQUENCY TRANSLATION

(75) Inventors: George Silverman, Bensalem, PA (US); Thomas W. Karras, Berwyn, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 842 days.

(21) Appl. No.: 10/383,955

(22) Filed: Mar. 7, 2003

Related U.S. Application Data

(60) Provisional application No. 60/420,941, filed on Oct. 23, 2002.

(51) Int. Cl.
*H04B 10/00* (2006.01)
(52) U.S. Cl. ..................... 398/115; 398/204
(58) Field of Classification Search ............... 398/201, 398/194, 204, 183, 188, 212, 9, 186, 163, 398/193, 115; 359/254, 326, 245
See application file for complete search history.

(56) References Cited

U.S. PATENT DOCUMENTS

| | | | | |
|---|---|---|---|---|
| 6,118,566 | A * | 9/2000 | Price | 398/194 |
| 6,275,317 | B1 * | 8/2001 | Doerr et al. | 398/201 |
| 6,487,004 | B1 * | 11/2002 | Strutz et al. | 359/326 |
| 6,493,127 | B2 * | 12/2002 | Gopalakrishnan | 359/254 |
| 7,003,231 | B2 * | 2/2006 | Way et al. | 398/186 |

OTHER PUBLICATIONS

Kitayama et al., *Optical Downconversion from Millimeter Wave to IF-Band Over 50-Km-Long Optical Fiber Link Using an Electroabsorption Modulator*, IEEE Photonic Technology Letters, vol. 11, No. 2, Feb. 1999.
Shin et al., *Optoelectronic RF Signal Mixing Using An Electroabsorption Waveguide as an Integrated Photodetector/Mixer*, IEEE Photonic Technology Letters, vol. 12, No. 2, Feb. 2000.

* cited by examiner

*Primary Examiner*—David C. Payne
(74) *Attorney, Agent, or Firm*—McDermott Will & Emery LLP

(57) ABSTRACT

An optoelectronic RF signal receiver utilizes a first RF to photonic modulator for receiving an optical carrier signal and an electrical signal from a local oscillator and producing an optical carrier signal with first optical sidebands offset from the carrier signal by the local oscillator frequency. A second RF to photonic modulator receives an electrical RF signal and the signals from the first modulator and produces second sidebands to each of the first optical sidebands from the first modulator with each of the second sidebands being offset from the first sidebands by the RF signal frequency. A detector then receives signals produced by the second modulator and produces an electrical IF signal for further processing. The receiver does not utilize a frequency translation device in the RF signal path and thereby eliminates RF loss, noise, and limited dynamic range characteristic of prior art electro-optical receivers. The two modulators can be biased for optimum linearity and for optimum rejection of in-band spurious signal products.

20 Claims, 2 Drawing Sheets

Non-serial frequency translation superheterodyne receiver

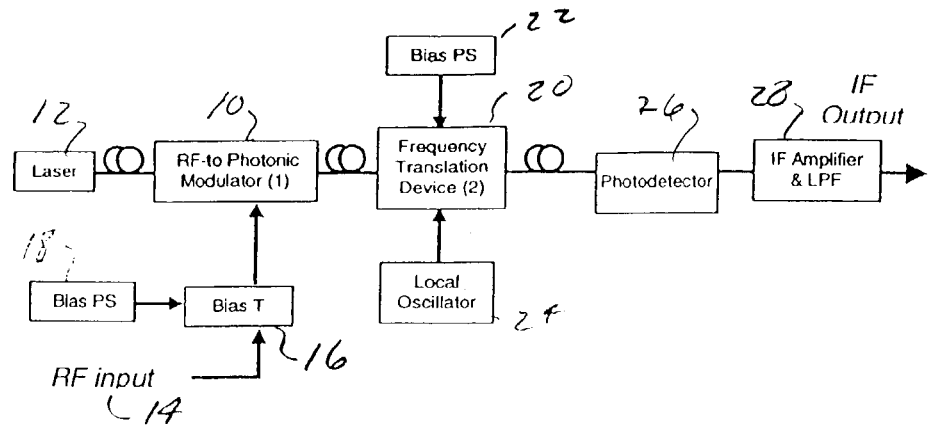
Figure 1. Superheterodyne receiver employing serial frequency conversion. (PRIOR ART)
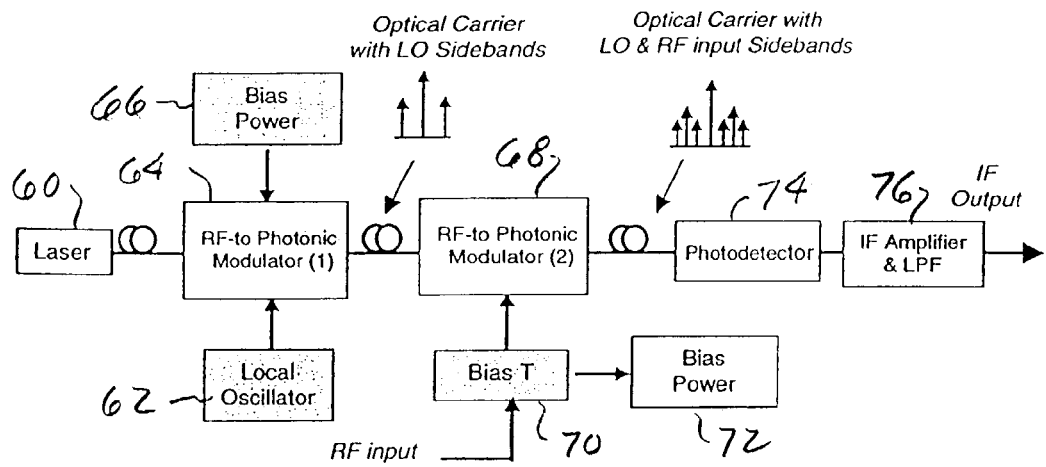
Figure 4. Non-serial frequency translation superheterodyne receiver
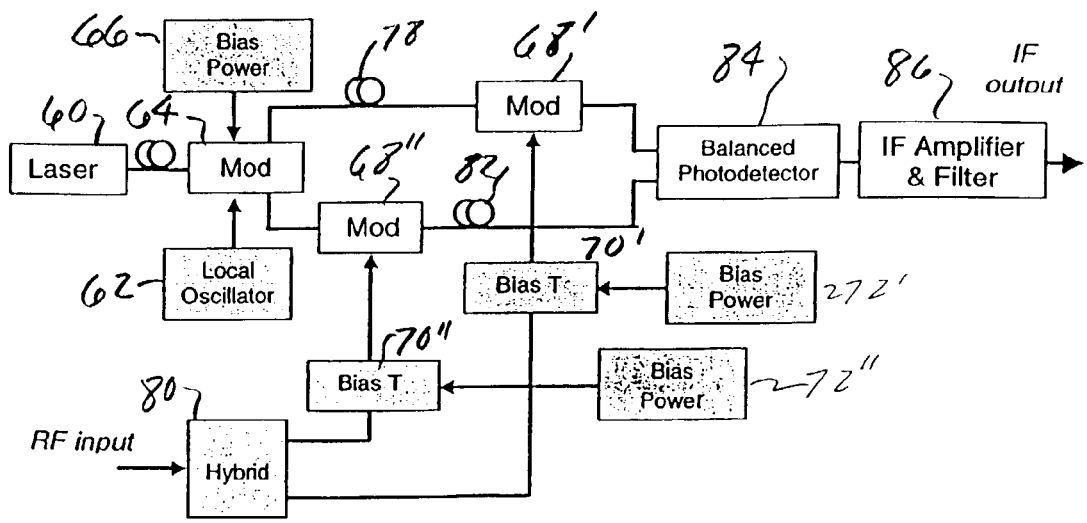
Figure 5. Balanced architecture providing common mode rejection

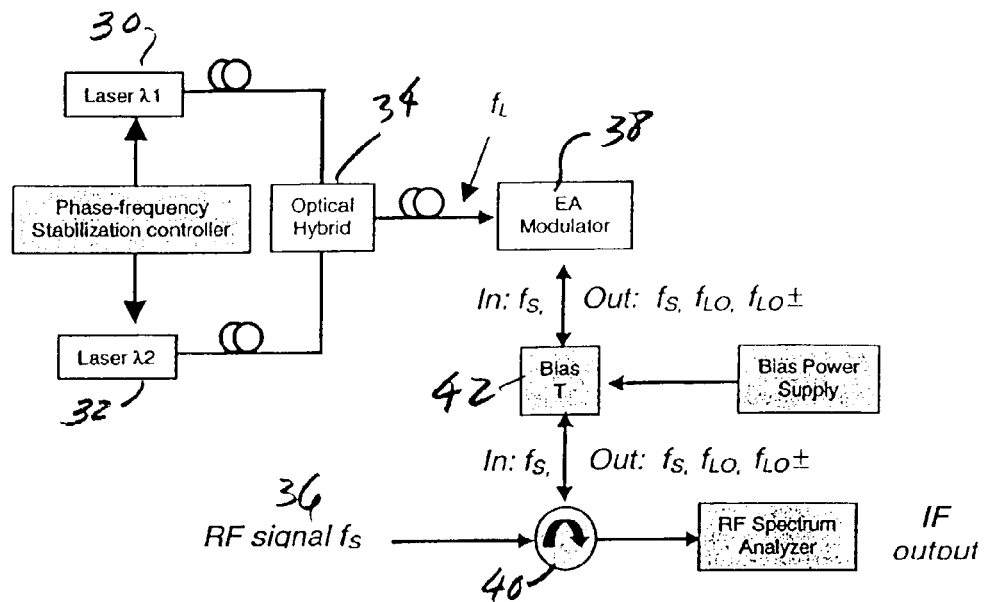
Figure 2. Frequency conversion in an electroabsorption modulator.
(PRIOR ART)
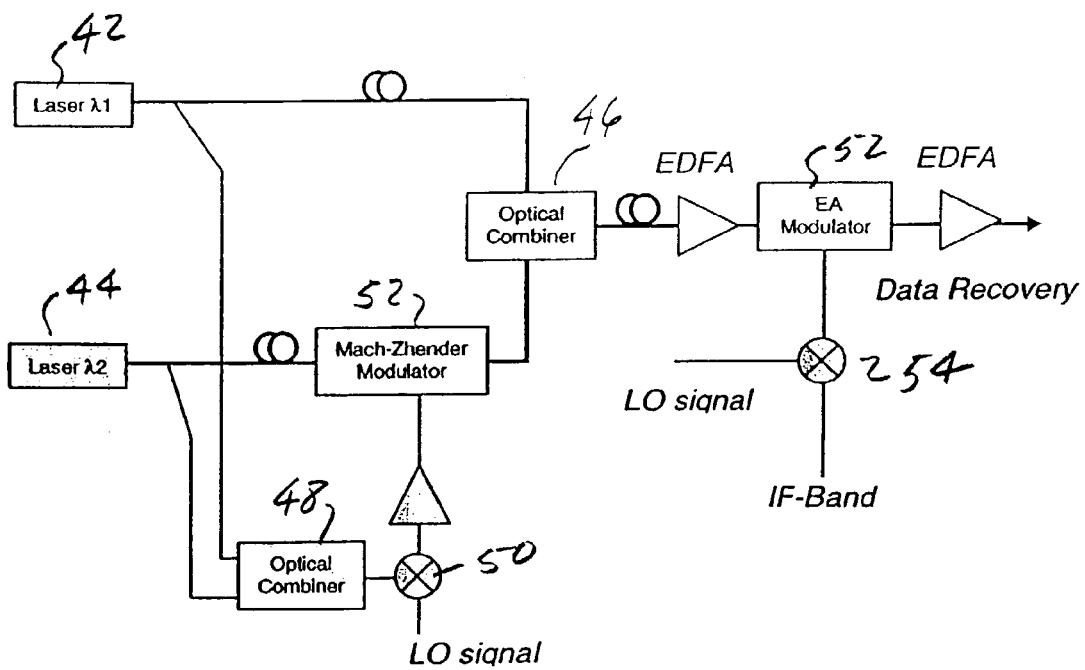
Figure 3. Superheterodyne receiver using two optical sources to produce the LO tone.
(PRIOR ART)

SUPERHETERODYNE PHOTONIC RECEIVER USING NON-SERIAL FREQUENCY TRANSLATION

CROSS-REFERENCES TO RELATED APPLICATIONS

This application claims priority to U.S. Provisional No. 60/420,941 filed Oct. 23, 2002, which is incorporated by reference herein.

STATEMENT AS TO RIGHTS TO INVENTIONS MADE UNDER FEDERALLY SPONSORED RESEARCH OR DEVELOPMENT

This invention was made with government support under Contract No. F33615-01-2-1843 awarded by the U.S. Air Force. The government has certain rights in this invention.

BACKGROUND OF THE INVENTION

This invention relates generally to RF and microwave superheterodyne receivers, and more particularly, the invention relates to such receivers employing photonic techniques including optoelectronic frequency translation.

Optoelectronic RF receivers are used to obtain high dynamic range, wide band width signal paths, high data rates, and low mass components. Such receivers have the ability to remotely locate various parts of the receiver system and to replace heavy, bulky, and stiff transmission lines with fiberoptic cables. Applications for the receivers are in satellite communications, electronic warfare, electronic support measures, and various radar applications.

FIG. 1 is a functional block diagram of a state of the art photonic superheterodyne receiver which includes an RF to photonic modulator 10 which modulates an optical signal from laser 12 with a received RF input signal 14. The RF signal is applied through a bias transistor circuit 16 with bias voltage from power supply 18 selected to maximize dynamic range and minimize harmonic distortion, for example. Modulator 10 converts the RF signal to optical sidebands of the CW optical carrier provided by the laser. A second modulator 20 in series with the RF signal and the sidebands of the optical carrier has a biased transistor power supply 22 and is driven by a local oscillator 24 to down convert the sidebands of the carrier to an IF frequency for detection by photodetector 26. A detected IF electrical signal is then applied to amplifier and low pass filter 28.

The RF to optical modulators and frequency translation devices may take the form of electroabsorption modulators, Mach-Zhender interferometers, and other conventional implementations. Narrow line width and low thermal drift lasers that can accommodate low RF frequency modulation are available using distributed feedback fiber laser technology or quantum dot laser technology.

Use of a frequency translation device such as modulator 20 in series with the RF signal path results in excessive RF loss, increased noise figure, and limited dynamic range. In a paper by Shin et al., "Optoelectronic RF Signal Mixing Using an Electroabsorption Waveguide as an Integrated Photo Detector/Mixer," IEEE Photonics Technology Letters, Vol. 12, No. 2, February 2000, overcomes some of the limitations of the prior art circuit of FIG. 1. As shown in FIG. 2, Shin et al use two Nd:YAG lasers 30, 32 to generate a beat frequency at 900 MHz at the optical hybrid 34, which is the local oscillator signal in this circuit. The 900 MHz LO signal and a 1.0 GHz RF signal are applied to an electroabsorption (EA) waveguide 38 which functions as an integrated photo detector/mixer. RF signal 36 is applied through a RF circulator 40 and bias transistor circuitry 42 to modulator 38, and modulator 38 provides as an output the RF signal frequency $f_S$, the local oscillator frequency $f_{LO}$, and the sum and difference of the two frequencies $f_{LO} \pm f_S$. EA modulator 38 comprises an InAsP—GaInP multiple-quantum-well EA waveguide which provides frequency conversion of the radiofrequency signals through field controlled absorption. While this receiver eliminates a frequency translation device from the RF series signal path, thus reducing RF signal loss, the necessity for beating of two laser signals to provide a local oscillator signal requires very fine line width and some means of locking the two optical sources together to maintain local oscillator frequency stability. Also, it is difficult to remotely locate the receiver front end and deal with cables and LO distribution in actual implementation.

Kitayama, "Optical Down Conversion from Millimeter-Wave to IF-Band Over 50-km-Long Optical Fiber Link Using an Electroabsorption Modular," IEEE Photonics Letters, Vol. 11, No. 2, February 1999 discloses another receiver in which an electroabsorption (EA) modulator is employed without the necessity for an RF mixer. As shown in FIG. 3, the Kitayama receiver again includes two lasers 42, 44 along with a fixed LO offset to generate the LO carrier signal at optical combiner 46. The outputs of the two lasers are applied to an optical combiner (photodiode) 48 with the beat frequency of the two lasers being applied to mixer 50 for mixing with a local oscillator signal. The resulting IF band is in the microwave region with the resulting signal being applied to a Mach-Zhender modulator 52 which modulates the optical field of laser 44. The output of MZM 52 is then combined with the output of laser 42 in optical combiner 46. The output of combiner 46 is then applied to EA modulator 52 along with the output of mixer 54 which receives the LO signal and the IF band (RF) signal. Again, like in the Shin receiver, an electroabsorption waveguide is used for demodulating the RF signal without the need for a further frequency translation device in the RF circuit path. However, like in Shin et al., two lasers are required in generating a carrier signal for use in the demodulation. This requires two locked phase or frequency lasers of narrow line width to produce a stable LO frequency.

BRIEF SUMMARY OF THE INVENTION

In accordance with one embodiment of the invention, an RF receiver utilizes at least two serially connected RF to photonic modulators with a first modulator mixing a local oscillator signal and a laser carrier signal to generate two local oscillator sidebands around the laser carrier and a second modulator mixing the LO sidebands with an RF signal to generate an IF signal for photo detection. Importantly, a frequency translation device is not required in series in the RF signal path as the IF frequency band is obtained from the RF modulator.

In accordance with one embodiment utilizing quadrature demodulation, the output of the first modulator is split and applied in two quadrature paths with second modulators located in each path, the second modulators responding to the carrier and LO sidebands from the first modulator and to the RF input to produce two IF signals which are applied to a balanced photodetector.

In accordance with one embodiment of the present invention, the photonic modulators can be electroabsorption waveguides as employed by Shin et al. and Kitayama. By eliminating a frequency translation device from the series RF signal path, signal loss is reduced and frequency translation is eliminated as a limitation on dynamic range. Additionally, the frequency translation device can be biased for optimum linearity while permitting the RF to optic modulator to be biased for optimum rejection of in-band spurious signal products.

In accordance with one embodiment of the present invention, an optoelectronic RF signal receiver comprises: a first RF to photonic modulator for receiving an optical signal and an electrical local oscillator signal and producing an optical carrier signal with first sidebands offset from the optical carrier signal by a frequency of the electrical local oscillator signal, and a second RF to photonic modulator for receiving an electrical RF signal and the optical signals from the first modulator and producing second sidebands to each of the first sidebands from the first modulator with each of the second sidebands being offset from the corresponding first sideband by the electrical RF signal frequency. The receiver further comprises a third RF to photonic modulator for receiving an electrical signal and the optical signals from the first modulator and producing third sidebands to each of the first sidebands from the first modulator with each of the third sidebands being offset from the corresponding first sideband by the electrical signal frequency.

In accordance with one embodiment of the present invention, a superheterodyne photonic receiver comprises a laser for producing an optical signal, a local oscillator for producing an electrical LO signal, a first photonic modulator receiving the optical signal and the electrical LO signal and producing an optical carrier signal with first sidebands offset from the optical carrier signal by an LO frequency, and a second photonic modulator receiving an electrical RF signal and the signals from the first modulator and producing second sidebands to each of the first sidebands from the first modulator with each of the second sidebands being offset from the corresponding first sideband by the electrical RF signal frequency. The receiver further comprises a third photonic modulator for receiving an electrical signal and the signals from the first modulator and producing third sidebands to each of the first sidebands from the first modulator with each of the third sidebands being offset from the corresponding first sideband by the electrical signal frequency.

In accordance with one embodiment of the present invention, a method of recovering a data signal from a transmitted RF signal comprises steps of: generating an optical carrier frequency signal with first sidebands and generating a first optical signal having the first sidebands, with second sidebands to each of the first sidebands with each of the second sidebands being offset from the corresponding first sideband by an RF signal frequency. The method further comprises a step of generating a second optical signal having the first sidebands with third sidebands to each of the first sidebands with each of the third sidebands being offset from the corresponding first sideband by an RF signal frequency.

BRIEF DESCRIPTION OF THE DRAWINGS

FIG. 1 is a functional block diagram of a superheterodyne photonic receiver employing serial frequency conversion as known in the prior art.

FIG. 2 is a photonic receiver employing an electrical absorption modulator as known in the prior art.

FIG. 3 is a functional block diagram of a superheterodyne receiver using electroabsorption modulators as known in the prior art.

FIG. 4 is a functional block diagram of a frequency translation superheterodyne receiver in accordance with one embodiment of the present invention.

FIG. 5 is a functional block diagram of a quadrature superheterodyne receiver in accordance with one embodiment of the invention.

DETAILED DESCRIPTION OF THE INVENTION

FIG. 4 is a functional block diagram of a low-loss, high-dynamic range RF receiver in accordance with one embodiment of the invention. In this embodiment, light from laser 60 is modulated with a signal from local oscillator 62 in modulator 64 which is preferably an electroabsorption waveguide modulator as known in the prior art, supra. Bias power at 66 is applied to modulator 64 for biasing for optimum linearity and producing an optical carrier with LO sidebands as illustrated. This signal is applied to a second RF to photonic modulator 68, along with the RF input which is applied through bias transistors 70 which are biased by power supply 72. Modulator 68 can be biased for optimum rejection of in-band spurious products and generates as an output the optical carrier with LO and RF input sidebands as illustrated. The IF signal is then recovered by photodetector 74 and amplifier and low pass filter 76. Modulator 68 may be biased in a number of ways independent of the bias applied to modulator 64 in order to maximize dynamic range by suppression of in-band spurious products or to minimize harmonic distortion, for example. Importantly, no frequency translation device is required in the serial RF signal path, as in FIG. 1, and the use of phase or frequency locked lasers of narrow line width are not required as in FIGS. 2 and 3.

FIG. 5 is a functional block diagram of another embodiment of the invention employing a balanced architecture which makes provision for cancellation of noise associated with the laser or light source. Again, a laser 60 and a local oscillator 62 apply inputs to modulator 64, and the output of modulator 64 is then split and applied to two separate optical paths. In one path, the output of modulator 64 is applied through a phase shifter 78 to modulator 68' which also receives an RF input signal from hybrid circuitry 80 through bias transistor 70'. The second output from modulator 64 is applied directly to a second modulator 68" in a second path which also receives an RF input signal from hybrid 80 through bias transistor 70". The output of modulator 68" is passed through a phase shifter 82 for phase coordination with the output of modulator 68' in a balanced photodetector 84. Balanced photodetector 84 recovers the IF signal which is applied to an amplifier and filter 86. Some conventional phase and amplitude trimming may be required but is not indicated to simplify the drawing.

From the foregoing it is seen that the invention eliminates frequency translation from the series RF signal path, thus reducing signal loss, and eliminates the frequency translation device as a limitation of dynamic range. By using two photonic modulators driven by a local oscillator and by the RF input, respectively, one modulator can be biased for optimum linearity while the other modulator is biased for optimum rejection of in-band spurious products.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An optoelectronic RF signal receiver comprising
a first RF to photonic modulator for receiving an optical signal and an electrical local oscillator signal and producing an optical carrier signal with first sidebands offset from the optical carrier signal by a frequency of the electrical local oscillator signal,
a second RF to photonic modulator for receiving an electrical RF signal and the optical signals from the first modulator and producing second sidebands to each of the first sidebands from the first modulator with each of the second sidebands being offset from the corresponding first sideband by the electrical RF signal frequency, and
a third RF to photonic modulator for receiving an electrical signal and the optical signals from the first modulator and producing third sidebands to each of the first sidebands from the first modulator with each of the third sidebands being offset from the corresponding first sideband by the electrical signal frequency.

2. The optoelectronic RF signal receiver as defined by claims 1 wherein the photodetector generates an electrical IF output signal.

3. The optoelectronic RF signal receiver as defined by claim 2 wherein the first modulator and the second modulator each comprises an electroabsorption modulator.

4. The optoelectronic RF signal receiver as defined by claim 3, wherein the second modulator and the third modulator are in separate signal paths in a quadrature heterodyne receiver.

5. The optoelectronic RF signal receiver as defined by claim 1 and further including a photodetector for receiving signals from the second and third modulators, wherein the second modulator and the third modulator are in separate signal paths in a quadrature heterodyne receiver.

6. The optoelectronic RF signal receiver as defined by claims 1 wherein the electrical RF signal is the same as the electrical signal, and the electrical RF signal frequency is the same as the electrical signal frequency.

7. A superheterodyne photonic receiver comprising:
a laser for producing an optical signal,
a local oscillator for producing an electrical LO signal,
a first photonic modulator receiving the optical signal and the electrical LO signal and producing an optical carrier signal with first sidebands offset from the optical carrier signal by an LO frequency,
a second photonic modulator receiving an electrical RF signal and the signals from the first modulator and producing second sidebands to each of the first sidebands from the first modulator with each of the second sidebands being offset from the corresponding first sideband by the electrical RF signal frequency, and
a third photonic modulator for receiving an electrical signal and the signals from the first modulator and producing third sidebands to each of the first sidebands from the first modulator with each of the third sidebands being offset from the corresponding first sideband by the electrical signal frequency.

8. The superheterodyne photonic receiver as defined by claim 7 and further including a photodetector for receiving signals from the second and third photonic modulators, wherein the second photonic modulator and the third photonic modulator are in separate signal paths in a quadrature heterodyne receiver.

9. The superheterodyne photonic receiver as defined by claim 8 wherein the first, second, and third photonic modulators each comprises an electroabsorption modulator.

10. The superheterodyne photonic receiver as defined by claim 9 wherein each of the first, second and third phontic modulators has bias power applied thereto to optimize performance.

11. The superheterodyne photonic receiver as defined by claim 10 wherein bias power to the first photonic modulator optimizes linearity and bias power to the second and third photonic modulators optimizes rejection of in-band spurious frequency products.

12. The superheterodyne photonic receiver as defined by claim 7 wherein the electrical RF signal is the same as the electrical signal, and the electrical RF signal frequency is the same as the electrical signal frequency.

13. A method of recovering a data signal from a transmitted RF signal comprising the steps of:
generating an optical carrier frequency signal with first sidebands,
generating a first optical signal having the first sidebands, with second sidebands to each of the first sidebands with each of the second sidebands being offset from the corresponding first sideband by an RF signal frequency, and
generating a second optical signal having the first sidebands with third sidebands to each of the first sidebands with each of the third sidebands being offset from the corresponding first sideband by an RF signal frequency.

14. The method as defined by claim 13 wherein:
in the step of generating an optical carrier frequency signal, a first RF to photonic modulator receives an optical signal and a local oscillator signal and generates the optical carrier frequency signal with the first sidebands.

15. The method as defined by claim 14 wherein in the step of generating a second optical signal, a third RF to photonic modulator receives signals from the first RF to photonic modulator and an RF signal and generates the second optical signal with each of the third sidebands being offset from the corresponding first sidebands by the frequency of the RF signal.

16. The method as defined by claim 15 wherein the third RF to photonic modulator comprises an electroabsorption modulator.

17. The method as defined by claim 13 wherein:
in the step of generating a first optical signal, a second RF to photonic modulator receives signals from the first RF to photonic modulator and an RF signal and generates the first optical signal with the second sidebands to each of the first sidebands with each of the second sidebands being offset from the corresponding first sidebands by the frequency of the RF signal.

18. The method as defined by claim 17 wherein the second RF to photonic modulator comprises an electroabsorption modulator.

19. The method as defined by claim 13 wherein the first and second optical signals are generated in a quadrature superheterodyne receiver, and the first and second optical signals are being detected in a balanced photodetector.

20. The method as defined by claim 13 further comprising steps of:
detecting the optical signal having the first sidebands and the second sidebands; and
detecting the second optical signal having the first sidebands and the third sidebands.

* * * * *

UNITED STATES PATENT AND TRADEMARK OFFICE
CERTIFICATE OF CORRECTION

| | | |
|---|---|---|
| PATENT NO. | : 7,269,354 B1 | Page 1 of 1 |
| APPLICATION NO. | : 10/383955 | |
| DATED | : September 11, 2007 | |
| INVENTOR(S) | : George A. Silverman et al. | |

It is certified that error appears in the above-identified patent and that said Letters Patent is hereby corrected as shown below:

In the Claims:

Column 5, line 2, "comprising" should read -- comprising: --.

Column 5, line 22, "claims 1" should read -- claim 1 --.

Column 5, line 37, "claims 1" should read -- claim 1 --.

Signed and Sealed this

Twentieth Day of May, 2008

JON W. DUDAS
*Director of the United States Patent and Trademark Office*